Figure 1:
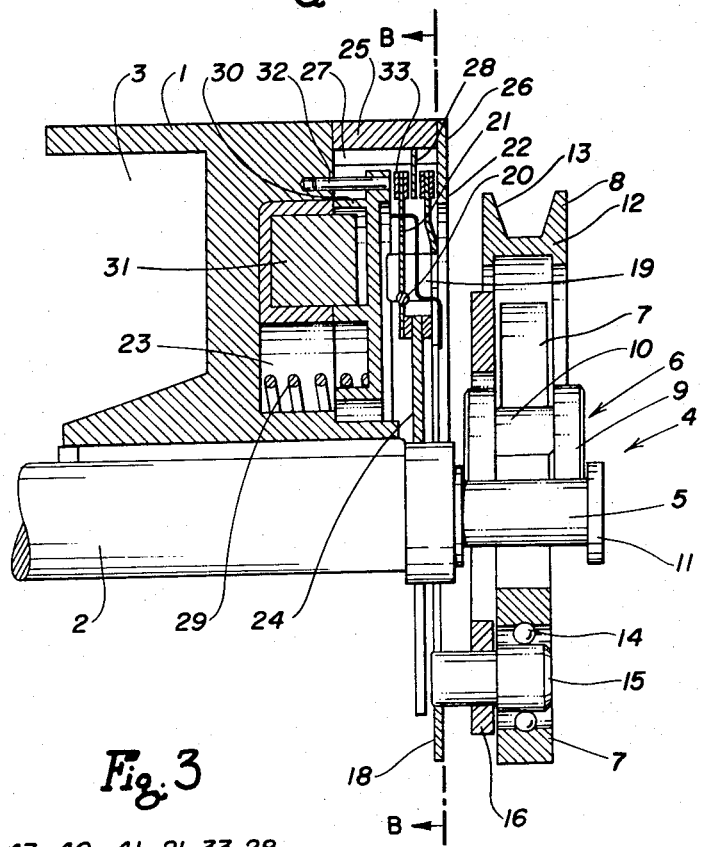

United States Patent

[11] 3,630,102

| [72] | Inventor | Preben Knud Larsen |
| | | Nordborg, Denmark |
| [21] | Appl. No. | 20,506 |
| [22] | Filed | Mar. 18, 1970 |
| [45] | Patented | Dec. 28, 1971 |
| [73] | Assignee | Danfoss A/S |
| | | Nordborg, Denmark |
| [32] | Priority | Apr. 2, 1969 |
| [33] | | Germany |
| [31] | | P 19 16 961.0 |

[54] WASHING MACHINE DRIVE
4 Claims, 4 Drawing Figs.

[52] U.S. Cl. ............................................. 74/789
[51] Int. Cl. ............................................. F16h 3/44
[50] Field of Search ............................. 74/792, 789

[56] References Cited
UNITED STATES PATENTS

| 2,087,261 | 7/1937 | Miller | 74/789 |
| 2,292,704 | 8/1942 | Lillquist | 192/90 UX |
| 2,477,024 | 7/1949 | Webster | 74/789 |
| 2,889,719 | 6/1959 | Honick | 74/789 X |
| 2,907,433 | 10/1959 | Maurice et al. | 192/12 X |
| 2,918,227 | 12/1959 | Mauborgne | 74/789 X |
| 3,160,128 | 12/1964 | Heidt | 192/18 |
| 3,261,234 | 7/1966 | Broschard et al. | 74/801 |
| 3,254,546 | 6/1966 | Nasvytis | 74/798 |

*Primary Examiner*—Arthur T. McKeon
*Attorney*—Wayne B. Easton

ABSTRACT: The invention relates to a washing machine drive comprising a motor and a planetary gear set having friction wheel gears. Clutch means are provided whereby two speeds, which are a spinning speed and a washing speed, are obtained by locking the planetary gear carrier to the sun gear or the casing. The clutch is operative in axial directions but is constructed so as to prevent axially directed forces from being transmitted to the friction wheels of the planetary gear set.

WASHING MACHINE DRIVE

The invention relates to a washing machine drive comprising a motor and a planetary gear and capable of being switched over from a spinning speed to a washing speed, it being possible to lock parts of the drive relatively to each other or relatively to the casing by means of a clutch arrangement which applies pressure in the axial direction.

The drum of a washing machine must be rotated more slowly during the washing operation and more rapidly during the spinning operation. Since the use of two motors having different initial speeds, or the use of a single reversible-pole motor is generally too expensive, it has been the practice to fit a variable planetary gear between a motor running at constant speed and the drum of the washing machine.

A planetary gear of this kind consists of a sun wheel, a set of planetary wheels with its associated carrier and an outer ring which mesh with each other through castellations. The input drive shaft is connected to the sun wheel and the output drive shaft to the member carrying the planetary wheels. A clutch means is provided for engaging the outer ring with the input shaft for effecting the spinning operation and for locking this ring firmly on the casing for carrying out the washing operation.

In a known washing machine drive, the gear side clutch element consists of an annular plate which is mounted for axial displacement on journals on the outer ring and is pressed against a clutch element solidly fitted to the casing by clutch springs backed by the outer ring. To effect a changeover the input drive shaft and a clutch wheel rotating therewith can be displaced axially to such an extent that the clutch plate engages with this clutch wheel and is disengaged from the clutch element solidly secured to the casing. The axial clutch forces acting on the outer ring are transmitted by a first axial bearing to the output drive shaft and by a second axial bearing to the casing. This results in a construction of considerable length. Moreover, the drive is expensive to produce, suffers considerable wear and operates in a relatively noisy manner.

The object of the invention is to provide an inexpensive, quiet washing machine drive having a lengthy service life and of shorter construction in the axial direction.

Based on the initially described washing machine drive, this object is achieved by the planetary gear taking the form of a friction wheel gear and by means being provided for reducing or eliminating the transmission of axial pressure to the friction wheel arrangement.

A friction wheel gear can be produced considerably more cheaply than a toothed-wheel gear. It also operates more quietly. On the other hand it is affected by unilateral loading to a greater extent than is a toothed-wheel gear. If however provision is made for the friction wheel gear to be substantially free from any axial load, an extremely long service life can be achieved. Furthermore, the gear does not require to incorporate axial bearings which lengthen the construction in the axial direction.

In a preferred embodiment, two sets of planetary wheels are provided, the gear side clutch element is associated with the outer set, and the outer ring acts as an output drive element. An increase in the number of planetary wheels is of only subsidiary importance as regards cost in the case of a friction wheel gear. By arranging the clutch, acting in the axial direction, on the outer set of planetary wheels, the outer ring is relieved of the changeover functions, at least as regards the braking action on the casing; it can therefore be used directly as the output drive element. This enables the construction on the output drive side to be considerably simplified. In particular, an output drive shaft and an associated bearing can be dispensed with, so that a construction of planetary gear that is extremely short in the axial direction is obtained. The use of two sets of planetary wheels also leads to a greater reduction and thus to a higher spinning speed and a smaller motor for the drive.

The point at which the clutch forces are applied should be spaced from the central axis at a distance equal to the distance between the outer planetary wheels. The greater this distance, the smaller are the clutch forces necessary for transmitting the motor torque or for counteracting it. However, the smaller the clutch forces, the easier it is to prevent their being transmitted to the friction wheel arrangement.

Furthermore, the motor can incorporate a short-circuiting outer rotor, and parts of the clutch means can be disposed in the space radially exterior of the gear side end of the stator winding. By utilizing this space, the axial length of construction absolutely necessary for the clutch means can be kept extremely small, so that the gear and the clutch means combined need project only a little distance beyond the motor in the axial direction.

The object of preventing the axial pressure from being transmitted to the friction wheel arrangement is achieved in a particularly expedient manner by means of backing members, which take up the axial pressure and are independent of the gear, and by means of a compensating arrangement which is fitted between the gear side clutch element and the associated friction wheel arrangement and which absorbs axial movement. Thus for example, use can be made of a first clutch spring, which is supported at one end on the casing and presses the gear side clutch element against a backing member solidly attached to the casing. Another possibility involves the use of a second clutch spring which is supported at one end on the gear side clutch element and presses the clutch element cooperating with the latter element against a backing member, which is connected to the gear side clutch element. In both cases the clutch force is applied without passing through the friction wheel arrangement.

In this connection, it is advantageous for the gear side clutch element to be constituted by an axially displaceable annular plate, on which are firmly fitted the journals for the planetary wheels of the outer set, and if the planetary wheels are mounted on the journal by means of roller bearings. The planetary wheels can then execute an axial compensating movement on the roller bearings.

In another embodiment, the gear side clutch element is an axially displaceable annular plate in which axially displaceable journals for the planetary wheels of the outer set are contained, and the planetary wheels are mounted on the journals by means of ball bearings so as not to be displaceable in the axial direction. This likewise permits axial displacement between the clutch element and the friction wheels.

It is particularly advantageous if the gear side clutch element associated with the outer set of planetary wheels can be selectively engaged with a nonrotating clutch element or with a clutch element that rotates with the sun wheel.

If the first clutch spring is stronger than the second clutch spring, counteracts it and can be rendered nonoperative by an actuating device, this ensures in a simple manner that the second clutch spring applies axial pressure in one position to which the system is switched, whereas in the second position the difference in the strength of the two springs is utilized for actuating the clutch arrangement.

In a particularly simple embodiment, the gear side clutch element is constituted by an annular plate and the associated backing member by the inner arms of two-armed radially extending rocking levers, mounted on the plate, the outer arms of which levers can be loaded by the first clutch spring. As long as only the second clutch spring is operative, the rotating clutch element is clamped between the inner arm and the plate. If however the stronger first clutch spring is operative, this clutch action does not take place. Furthermore, the first clutch spring can act on the outer arms of the rocking levers by way of an element forming part of the actuating device, and these levers can be pressed against the annular plate by interposing a nonrotatable, axially displaceable vane and the levers can thus press the annular plate against the backing member solidly attached to the casing. In this manner, the spindles of the outer set of planetary wheels are immobilized.

It is particularly advantageous if the device for actuating the clutch comprises an electromagnet, concentric with the central axis, and, as the actuating element, an axially displaceable annular armature. The electromagnet can be accommodated in, for example, the unoccupied space outside the winding of the inner stator.

The first clutch spring can be a helical spring concentric with the central axis. A spring of strip material can be used as the second clutch spring. Furthermore, it is possible for each of the rocking levers to carry on its axially extending arm a centrifugal weight which reinforces the action of the first clutch spring. When the gear side clutch element is at a standstill, this centrifugal weight is nonoperative, but when the gear side clutch element is rotating, the force effecting the clutch action is increased.

In accordance with a further aspect of the invention, the interengaged friction wheels can be secured against axial displacement by means of lateral limiting flanges on each wheel. Relatively thin flanges suffice for the purpose, since they merely act as axial guides, but do not have to absorb substantial axial forces.

Figure 3:
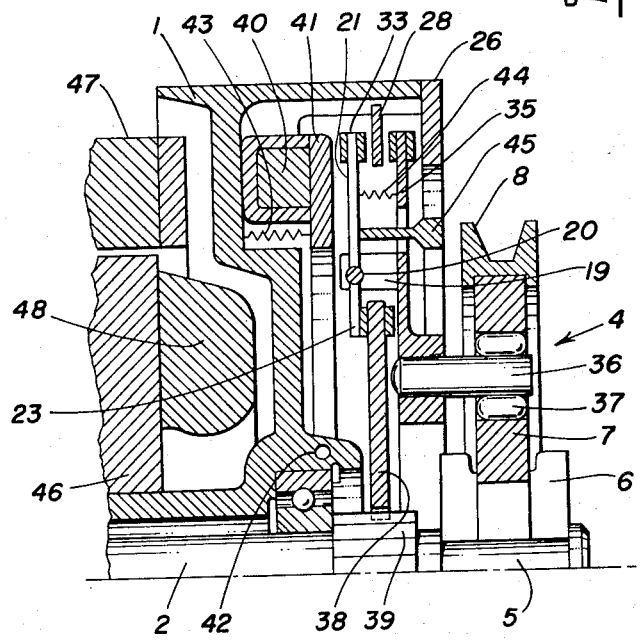
Figure 2:
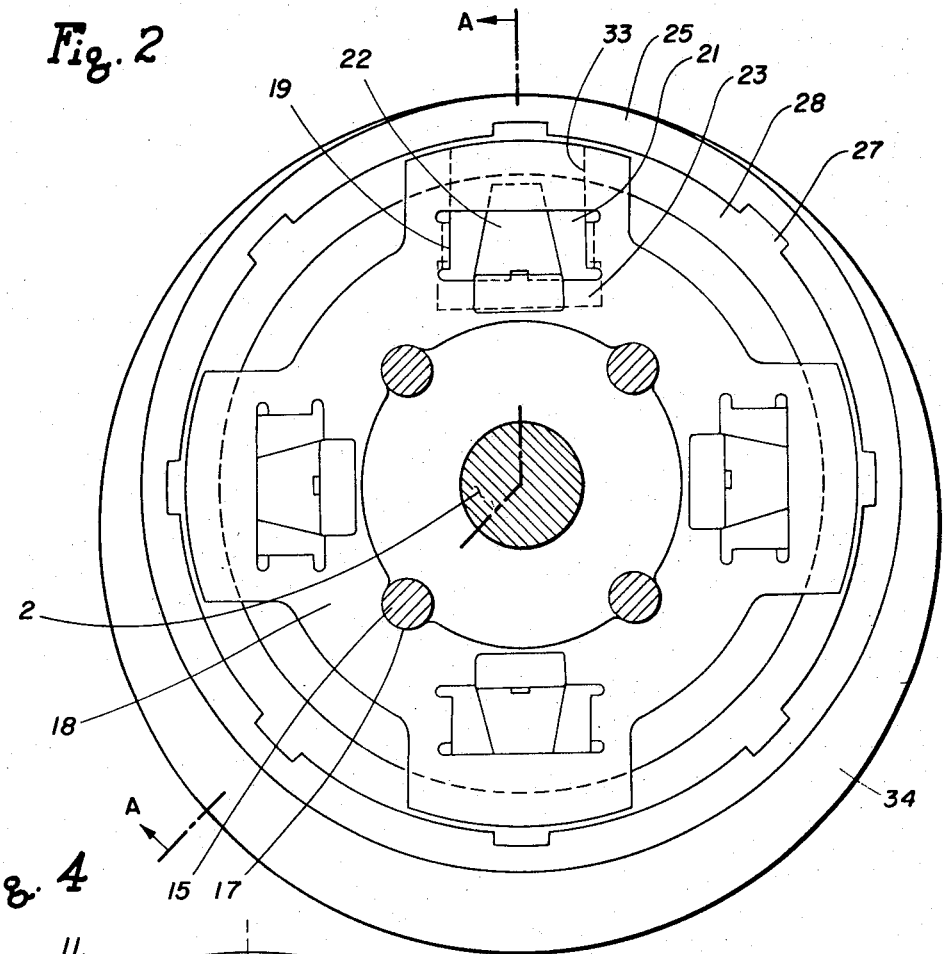
Figure 4:
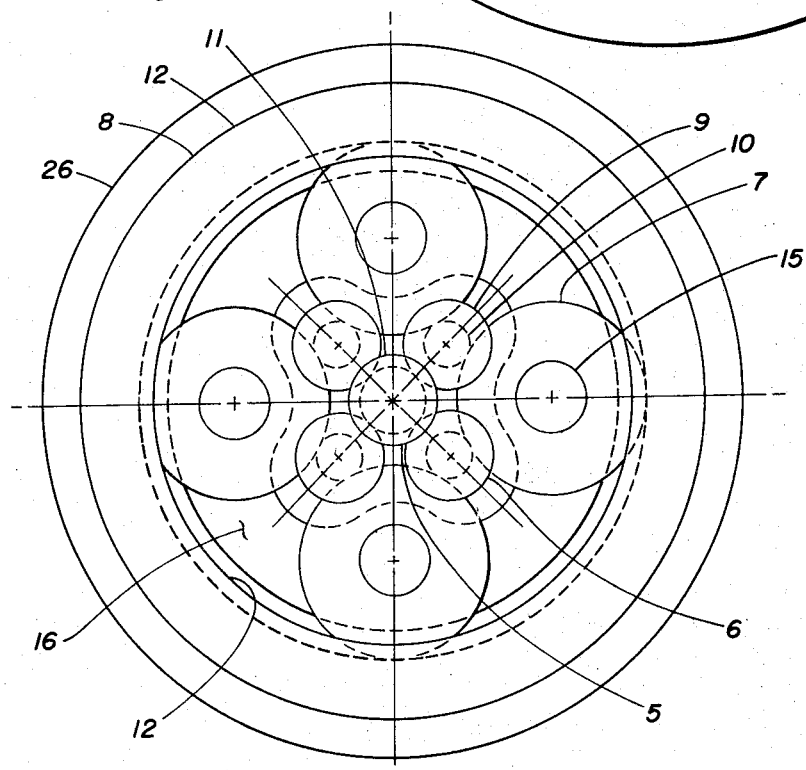

The invention will now be described in more detail by reference to embodiments illustrated in the drawing, in which:

FIG. 1 shows a partial longitudinal section through a first embodiment of a washing machine drive, on the line A—A of FIG. 2, FIG. 2 is a cross section through the washing machine, on line B—B of FIG. 1, FIG. 3 is a partial longitudinal section through a further embodiment; and FIG. 4 is an end view, from the right side of FIG. 1.

In the embodiment shown in FIGS. 1 and 2, a drive shaft 2 is mounted in a casing 1 and is powered by a motor, not illustrated, accommodated in the space 3. The drive shaft 2 carries at its forward end a planetary gear 4. This consists of a sun wheel 5, a first set of planetary wheels 6, a second set of planetary wheels 7 and an outer ring 8. The planetary wheel 6 has a first step 9 of greater diameter on the input drive side, and a second step 10 of smaller diameter on the output drive side. The steps 9 constitute limiting flanges, which prevent lateral misalignment of the planetary wheel 7. The limiting flange 11 on the sun wheel 5 and the limiting flange 12 on the outer ring 8 prevent axial movement of the adjacent planetary wheels, so that the outer ring 8, which contains a groove 13 for accommodating an output drive belt, maintains a precisely predetermined axial position relative to the sun wheel 5. All wheels are designed as friction wheels.

For the purpose of greater clarity, the inner planetary wheel 6 is omitted from the lower half of FIG. 1. The outer planetary wheel 7 is mounted by means of ball bearings 14 on a journal 15, which is firmly inserted in a carrier ring 16. An extension of the journal engages in the hole 17 in an annular plate 18, which acts as the gear side clutch element. The hole 17 permits relative movement in the axial direction between the journal 15 and the annular plate 18. The ball bearing element 14 on the other hand does not permit axial movement between the journal 15 and the friction wheel 7.

Provided on the annular plate 18 are inwardly projecting tabs 19, which carry, on a pivot 20, a two-armed rocking lever 21. A leaf spring 22 swings the rocking lever in such manner that its inner arm 23 is pressed against the annular plate 18. A disc 24 is thereby clamped between the two parts, friction linings being interposed, and the disc 24 is secured to the drive shaft 2 so as not to rotate therewith and acts as a rotating clutch element.

The casing carries an attachment 25, which has a backing member 26 at its end face and also carries an annular vane 28 fitted in grooves 27. A spring 29, which is arranged concentrically with the shaft 2 and is stronger than the spring 19, acts on an annular armature 30 of a likewise concentrically arranged, annular electromagnet 31. The armature is axially located with the help of pins 32. In FIG. 1, the armature 30 is pulled up by the electromagnet 31. If there is no magnetic force in the clutch spring 29, this presses the armature 30 to the right, and the armature presses the radially exterior arm 33 on the rocking lever 21 against the vane 28, friction linings being interposed; the armature also presses the outer circumference of the annular plate 18 against the backing member 26, solid with the casing. At the same time, the inner arm 23 is lifted from the rotating disc 24 by the tilting movement of the lever 21.

It follows that when the magnet 31 is deenergized, the annular plate 18 is brought to a stop, it being possible to take a low speed (washing operation) from the outer ring 8. When the magnet 31 is energized however, the annular plate 18 is driven by the rotating disc 24, so that the outer ring 8 rotates at a speed of the input drive shaft 2 (spinning operation).

The force of the first stronger clutch spring 29 as well as the force from the weaker second clutch spring 22 operate only between part of the clutch means, i.e. the spring 29 between the casing 1 and the backing member 26 solid with the casing, and the spring 19 between the annular plate 18 and the inner arm 23 of the rocking lever 21. Consequently, no axial forces at all are transmitted to the friction wheel gear. Small axial displacement of the annular plate 18 is possible, since the holes 17 can slide along the journals 15.

In order not to overload the drawing, FIG. 2 shows, in broken lines, the travel of the upper rocking lever 21 only.

In the embodiment seen in FIG. 3, the same reference numerals as in FIGS. 1 and 2 are used for like or equivalent parts. Therefore, only those parts constituting a modification of the preceding embodiment will now be described.

The annular plate 35, acting as the gear side clutch element, directly supports journals 36, immovable in the axial direction, on which are mounted, by means of needle bearings 37, the outer planetary wheels 7. Because of the use of needle bearings, the journal 36 can move backwards and forwards in the friction wheel 7 in the axial direction. The disc 38, used as the rotating clutch element, is mounted, by means of a toothed portion, on the drive shaft 22 so as not to rotate therewith, and it thus has freedom of movement in the axial direction.

For actuating the system there is provided an annular electromagnet 40 with which is associated an annular armature 41, which is nonrotatably mounted in guide means, not illustrated, solid with the casing, but which can be axially displaced. When the magnet 40 is not excited, the armature, under the action of the first spring 43, is pressed against the upper arm 33 of the rocking lever 21, and presses this against the vane 28, and also urges the annular plate 35 against the backing member 26 solid with the casing. A helical spring 44 is used as the second clutch spring. The rocking lever 21 also carries on an axially extending arm a centrifugal weight 45, which reinforces the action of the spring 44 when the annular plate 35 rotates.

The motor has an inner stator 46 and an outer short-circuiting rotor 47. The casing 1 is set back somewhat beyond the end 48 of the stator winding, so as to provide room for the magnet 40 actuating the clutch means.

I claim:

1. A washing machine drive mechanism comprising a casing, a drive shaft, a planetary gear set including a group of planetary gears, friction wheel gears in said gear set having flanges for positively limiting axial movement of said gears, a planetary gear carrier, journals extending axially from said group of planetary gears, an annular plate having holes for receiving said journals in rotational driving relation, a clutch element rotatable with said shaft and being axially movable relative thereto, shifting means for selectively moving said clutch element axially into engagement with said annular plate to cause rotation of said carrier with said shaft and for selectively moving said annular plate into engagement with said casing to hold said carrier relative to said casing, first and second spring means for actuating said shifting means in opposite directions, an actuating device for rendering one of said spring means inoperative, a lever pivotally mounted on said annular plate, said lever having inner and outer arms, said outer arm being loaded by said first spring means.

2. A drive mechanism according to claim 1 including an electromagnet, said actuating device being the movable armature part of said electromagnet.

3. A drive mechanism according to claim 1 wherein said first spring means is a helical spring concentrically mounted and disposed relative to said shaft.

4. A drive mechanism according to claim 1 wherein said first arm has weight means thereon spaced from the pivot axis of said lever, said weight means exerting a centrifugal force to supplement the force of said first spring means.

* * * * *